(12) United States Patent
Smith et al.

(10) Patent No.: US 8,955,045 B2
(45) Date of Patent: Feb. 10, 2015

(54) FACILITATING VARIED ACCESS BASED ON AUTHENTICATION SCORING

(71) Applicant: Intel Corporation, Santa Clara, CA (US)

(72) Inventors: Ned Smith, Hillsboro, OR (US); Keith Shippy, Tempe, AZ (US); Tobias Kohlenberg, Portland, OR (US); Manish Dave, Folsom, CA (US); Omer Ben-Shalom, Rishon Le-Tzion (IL); Mubashir Mian, Morton Grove, IL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/630,095

(22) Filed: Sep. 28, 2012

(65) Prior Publication Data

US 2014/0096177 A1 Apr. 3, 2014

(51) Int. Cl.
*G06F 21/00* (2013.01)

(52) U.S. Cl.
USPC .......................... 726/2; 726/1; 726/3; 726/7

(58) Field of Classification Search
USPC .................................... 726/1, 2, 3, 7
See application file for complete search history.

(56) References Cited

U.S. PATENT DOCUMENTS

| | | | | |
|---|---|---|---|---|
| 7,908,645 | B2 * | 3/2011 | Varghese et al. | 726/4 |
| 2001/0049785 | A1 * | 12/2001 | Kawan et al. | 713/156 |
| 2012/0159590 | A1 * | 6/2012 | Novack et al. | 726/7 |
| 2013/0174222 | A1 * | 7/2013 | Ogle | 726/3 |

OTHER PUBLICATIONS

Susan Snedaker, The Best Damn IT Security Management Book Period, 2007, ISBN: 9780080557335, ACM.*
Pranab Mohanty, Privacy & Security Issues Related to Match Scores, 0-7695-2646-2/06, 2006, IEEE.*

* cited by examiner

*Primary Examiner* — Yin-Chen Shaw
*Assistant Examiner* — Gita Faramarzi
(74) *Attorney, Agent, or Firm* — Jordan IP Law, LLC

(57) ABSTRACT

Systems and methods may provide for determining a composite false match rate for a plurality of authentication factors in a client device environment. Additionally, the composite false match rate can be mapped to a score, wherein an attestation message is generated based on the score. In one example, the score is associated with one or more of a standardized range and a standardized level.

26 Claims, 5 Drawing Sheets

US 8,955,045 B2

FACILITATING VARIED ACCESS BASED ON AUTHENTICATION SCORING

BACKGROUND

Embodiments generally relate to computing device security. More particularly, embodiments relate to facilitating varied device access based on authentication scoring.

Computing device security can be a concern in a wide variety of user-based contexts such as electronic commerce (e-commerce), online banking, business to business (B2B) transactions, and so forth. Developments in multi-factor authentication (MFA) may provide for the use of multiple authentication interfaces, devices and/or sensors (e.g., "factors") such as password entry interfaces, smart cards and one time password (OTP) transceivers to increase confidence in the user authentication process. Accordingly, MFA policies may be developed based on first order Boolean logic, where the combination of factors are governed by AND, OR and NOT operators on sets of factors.

The range of possible factors is typically not fixed, however, because device innovation can drive the creation of new factor types. As a result, updating MFA policies can present significant administrative and processing overhead challenges, particularly when many different computing nodes and/or service providers involved in providing services to client devices each have different administrative authority. Indeed, the lack of a universal policy language to express MFA policies may lead to the use of multiple different languages (e.g., XACML/eXtensible Access Control Markup Language, Javascript, HTML/Hypertext Markup Language, JSON/Javascript Object Notation) to encode MFA policies for consumption by a broad spectrum of computing nodes and service providers. Such an approach may further increase administrative and processing overhead.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
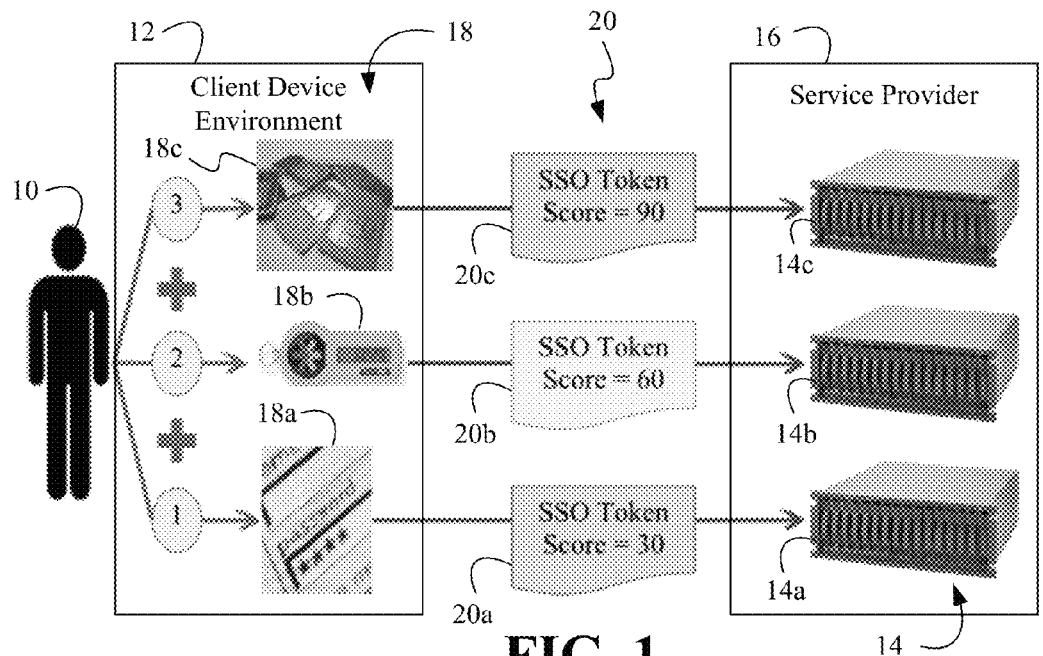
FIG. 1 is a block diagram of an example of a multi-factor authentication scheme according to an embodiment.

Turning now to FIG. 1, a multi-factor authentication (MFA) scheme is shown in which a user 10 interacts with a client device environment 12 in order to access resources 14 (14a-14c) of a service provider 16, wherein the resources 14 may be associated with varying sensitivity/authorization levels. For example, a first resource 14a might constitute an unclassified resource that corresponds to a lowest (e.g., least secure) sensitivity level, whereas a second resource 14b may include a more sensitive resource than the first resource 14a. Similarly, a third resource 14c may be a restricted resource that corresponds to a highest (e.g., most secure) sensitivity level.

In the illustrated example, the client device environment 12 uses a client device (not shown, e.g., desktop computer, notebook computer, smart tablet, personal digital assistant (PDA), mobile Internet device, smart phone, media player, imaging device) to process data input via a plurality of authentication factors 18 (18a-18c) to authenticate the user 10. For example, a text entry field on a display of the client device might be used as a first authentication factor 18a to receive a traditional password or PIN (personal identification number), whereas another text entry field may be used in combination with a one time password (OTP) transceiver as a second authentication factor 18b. Similarly, a smart card may be plugged into a card slot of the client device, wherein the smart card may constitute a third authentication factor 18c.

Of particular note is that the illustrated authentication factors 18 have varying sensitivity/confidence levels as to the amount of security provided by the authentication factors 18. For example, the first authentication factor 18a (e.g., password entry interface) might be considered the least secure, particularly if the password is relatively short or has minimal constraints on the selection of the content or reset frequency of the password. The second authentication factor 18b (e.g., OTP transceiver), on the other hand, could be considered more secure than the first authentication factor 18b due to the temporary nature of the OTP, whereas the third authentication factor 18c (e.g., smartcard) may be considered the most secure due to the hardware nature and tighter controls over the information stored on the smart card. Two or more of the authentication factors 18 could also be associated with a similar amount of security, wherein combining authentication factors 18 in and of itself may increase the amount of security provided. In one example, the amount of security provided is quantified in terms of a false match rate (FMR), wherein relatively insecure authentication factors may have a relatively high FMR, and relatively secure authentication factors may have a relatively low FMR.

The illustrated client device environment 12 generates single sign on (SSO) tokens having standardized scores 20 (20a-20c) that mask the underlying FMR data and/or MFA policies leading to the generation of the scores. Thus, the scores 20 enable the service provider 16 to determine whether to grant access to the resources 14 without knowledge of the types of authentication factors 18 used, the security characteristics (e.g., FMRs) associated with the authentication factors 18 or the Boolean based MFA policies corresponding to each sensitivity level. Accordingly, as new authentication factors are developed and made available to the user 10, the scores 20 need not change from the perspective of the service provider 16. Moreover, any need to use different languages to code the MFA policies for different service providers can be obviated because the MFA policies are withheld from the service providers, in the example shown. Simply put, the illustrated scheme reduces administration and processing overhead by standardizing the scores 20 and eliminating multi-language coding of the underlying MFA policies.

Figure 2:
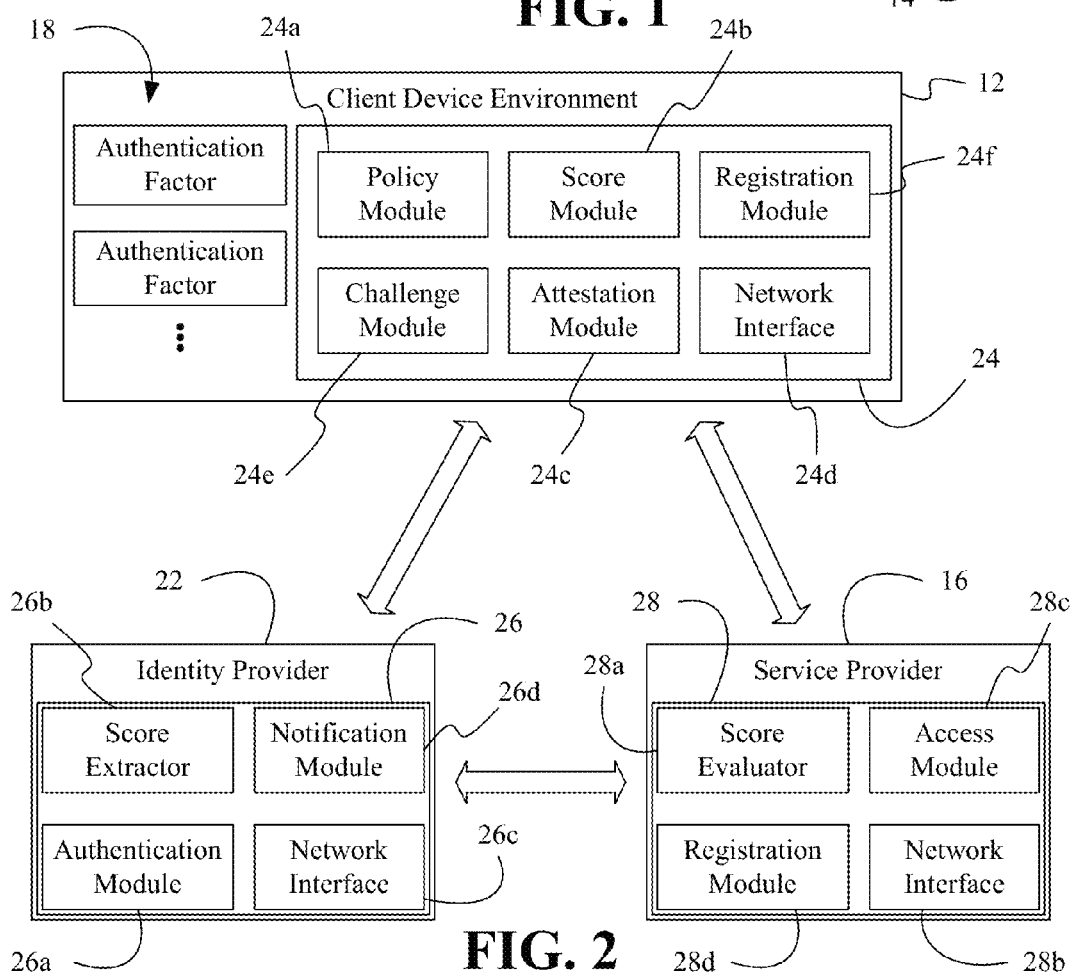
FIG. 2 is a block diagram of a multi-factor authentication computing architecture according to an embodiment.

FIG. 2 shows an MFA computing architecture in which the client device environment 12 may provide standardized scores either directly to the service provider 16 or indirectly to the service provider 16 via an identity provider (IdP) 22. The illustrated client device environment 12 includes the plurality of authentication factors 18 and a logic architecture 24 (24a-24f, e.g., user authentication authority/UAA) executing on a client device, wherein the authentication factors 18 may be connected to the logic architecture 24 via a trusted path mechanism. For example, an input output (IO) subsystem (not shown) having bus lines that are dedicated (e.g., either by bus addressing constraints or through encryption) to the authentication factors 18 and logic architecture 24 may be used to facilitate communication between the authentication factors 18 and logic architecture 24. Additionally, the logic architecture 24 may constitute a secure execution environment such as a security co-processor or IO controller, where host software and/or drivers cannot modify the code or functionality of the logic architecture 24. Example implementations of such a secure execution environment may include, but are not limited to a Manageability Engine, Converged Security Engine, Secure Enclave, and so forth.

The logic architecture 24 may have a policy module 24a to determine composite FMRs for the authentication factors 18 as they are used to gain access to resources such as the resources 14 (FIG. 1). As already noted, for each authentication factor 18, there may be an FMR that specifies the probability of a false match. For example, a typical FMR for a biometric device might be $1 \times 10^{-6}$, whereas a six-digit password may have a FMR of $2.3 \times 10^{-10}$. Moreover, a plurality of FMRs can be multiplied together to determine a composite FMR. For example, a two-factor authentication scheme may have a composite FMA in the form of MF-FMR=FMR1*FMR2 (e.g., $1 \times 10^{-6} * 2.3 \times 10^{-10} = 2.3 \times 10^{-16}$).

The illustrated logic architecture 24 also includes a score module 24b that maps composite FMRs to scores such as the scores 20 (FIG. 1). For example, the score module 24b might implement a choice relationship between the composite FMRs and specific sensitivity levels (e.g., scores), Sensitivity Level (SL)=Choice(MF-FMR: FMR-L0→L0|FMR-L1→L1|FMR-L3→L3 ... ).

Thus, once a composite FMR exceeds a threshold for a certain level, the score for that particular level may be chosen. In another example, the score module 24b might chose between a range of values, SL=Choice(MF-FMR: Range ($FMR1_{min}$, $FMR1_{max}$), Range ($FMR2_{min}$, $FMR2_{max}$), Range ($FMR3_{min}$, $FMR3_{max}$), ... ).

Additionally, the score may be represented as a value between zero and one, where an arbitrary number of ranges can be defined corresponding to the sensitivity level (e.g., L0=Range(0, 0.333), L1=Range(0.334, 0.666), L2=Range (0.667, 1)).

Simply put, the scores may be associated with one or more of a standardized level and a standardized range, wherein a community of interest may agree to a common standard deviation for scoring factors and a common class of scores. Of particular note is that the common standard may not require publication of a protocol, data structure or syntax. Rather, only configuration of the common settings may be involved, which can significantly simplify the overhead involved in forming new communities of interest/social networks.

The logic architecture 24 may also have a challenge module 24e to challenge a user via the plurality of authentication factors 18 and identify the plurality of FMRs corresponding to the plurality of authentication factors 18, wherein the composite FMR can be determined based on the plurality of FMRs, as already discussed. A target FMR can be used to challenge the user, wherein the user is challenged until the target FMR is met. The target FMR may be specified by the service provider 16 or user defined. In one example, the target FMR is cached locally in the client device environment 12 for a certain amount of time (e.g., while the user is present).

In addition, the illustrated logic architecture 24 includes a registration module 24f configured to obtain/receive registration information from the service provider 16 (e.g., directly or indirectly via an identity provider), wherein the registration information may include, for example an indication of acceptable provider ranges for resources of the specific service provider 16. In this regard, different service providers may establish different score ranges based on the particular security needs of the service provider. Thus, the score module 24b might determine within which provider range a particular score falls. In one example, the logic architecture 24 runs in a trusted execution environment such as a manageability engine or a security co-processor.

Additionally, the logic architecture 24 may include an attestation module 24c to generate attestation messages based on the scores, wherein a network interface 24d may send the attestation messages to either the service provider 16 or the IdP 22. As already noted, the composite FMR and underlying MFA policies may be withheld by the policy module 24a and/or logic architecture 24 from the service provider 16 and/or IdP 22. In one example, the attestation module 24c incorporates resource requests into the attestation messages and signs the attestation messages using an attestation key (e.g., enhanced privacy identifier/EPID) before sending them. Additionally, the attestation messages may be encrypted if they are sent directly to the service provider 16, which may be capable of supporting SSO authentication as a condition of access.

As already noted, the attestation messages may alternatively be sent to the IdP 22 if, for example, the service provider 16 does not support SSO authentication or has established a relationship with the IdP 22 for some other reason. The illustrated IdP 22 has a logic architecture 26 (26a-26d) executing on a computing platform such as a server, desktop computer, mobile computing device, etc. The logic architecture 26 may include a network interface 26c to receive the attestation messages from the client device and an authentication module 26a to authenticate the client device environment 12 in response to the attestations messages. Additionally, a score extractor 26b may identify MFA scores in the attestation messages, wherein the MFA scores are associated with standardized ranges and/or levels. The logic architecture 26 may also include a notification module 26d to notify the service provider 16 of the MFA scores. In one example, the notification module 26d creates access tokens based on the MFA scores, signs the access tokens (e.g., using shared secret media access control/MAC key, IdP private key) and sends the access tokens to the service provider 16 via the network interface 26c. The notification module 26d may also identify resource access requests in the attestation messages and incorporate the resource access request into the access tokens. Moreover, the notification module 26d may encrypt the access tokens (e.g., using service provider public key, shared secret) prior to sending the access tokens to the service provider 16. The IdP 22 may also be in charge of an enrollment/registration process in which client lists are managed in order to ensure that the client device environment 12 (and other client device environments) is provided with the appropriate provider ranges, target FMRs, and so forth.

The illustrated service provider 16 includes a logic architecture 28 executing on a computing platform such as a server, desktop computer, mobile computing device, etc. The logic architecture may include a score evaluator 28a which, upon receiving either attestation messages from the client device environment 12 or access tokens from the IdP 22 via a network interface 28b, identifies MFA scores associated with a standardized level and/or range. Additionally, the score evaluator 28a can determine whether the MFA scores are within provider ranges associated with resources of the service provider 16. Accordingly, an access module 28c may either grant the client device environment 12 access to resources if the associated MFA scores are within the appropriate provider ranges, or deny the client device environment 12 access to resources if the associated MFA scores are outside the appropriate provider ranges. The logic architecture 28 may also include a registration module 28d to submit registration information to the client device environment 12 and/or the IdP 22, wherein the registration information may include the provider ranges, target FMRs, etc., as already discussed.

Figure 3A:
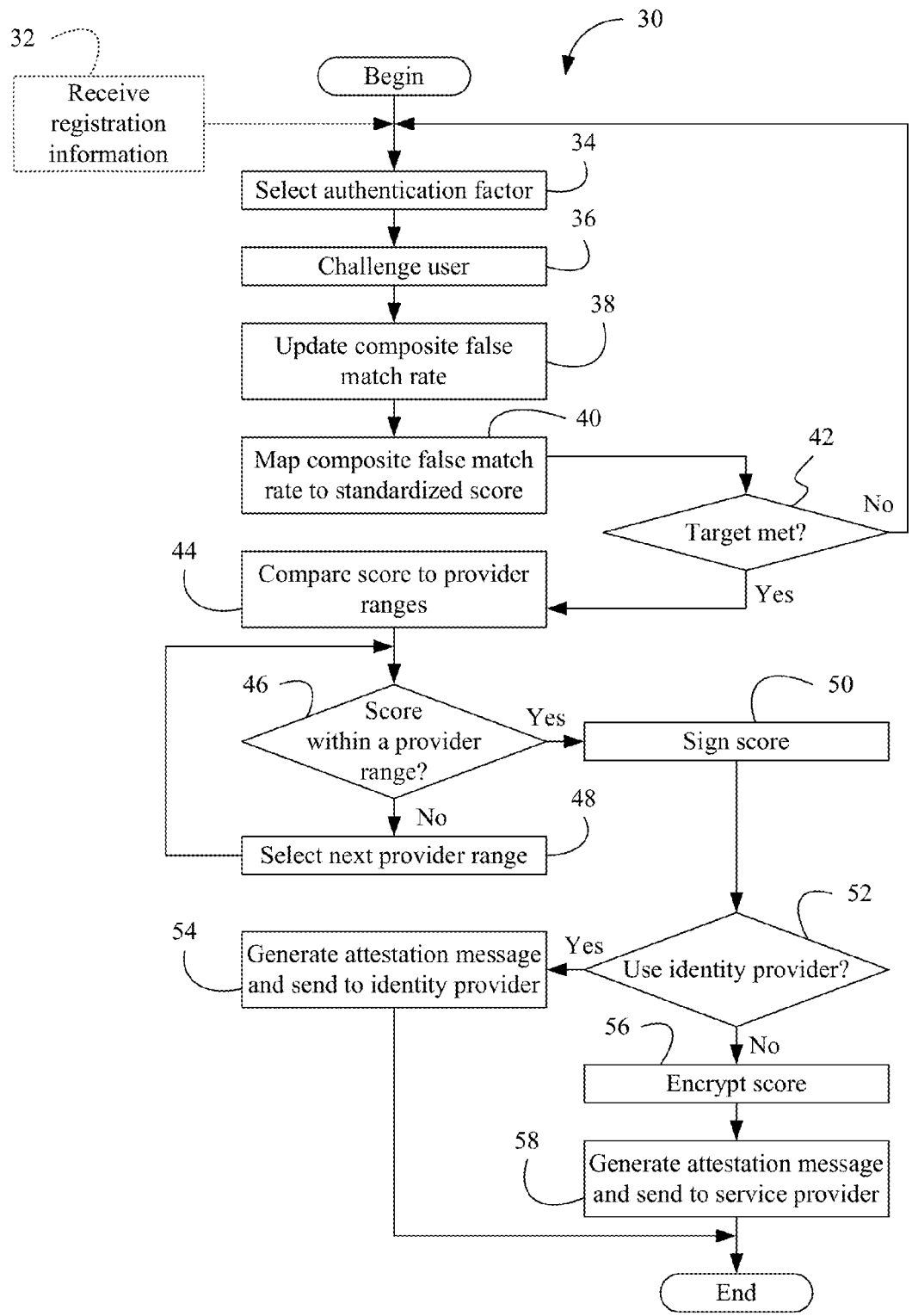
FIG. 3A is a flowchart of an example of a method of operating a user authentication authority according to an embodiment.

FIG. 3A shows a method 30 of operating a client device. The method 30 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 30 may be written in any combination of one or more programming languages, including an object oriented programming language such as C++ or the like and conventional procedural programming languages, such as the "C" programming language or similar programming languages. Moreover, the method 30 may be implemented as the logic architecture 24 (FIG. 2) using any of the aforementioned circuit technologies.

Illustrated processing block 32 provides for receiving registration information (e.g., offline) from a service provider, wherein the registration information identifies one or more provider ranges for MFA scores. Each provider range may be associated with a resource of a specific service provider. An authentication factor may be selected at block 34, wherein block 36 can provide for challenging a user via the selected authentication factor. A composite FMR may be updated at block 38, wherein illustrated block 40 maps the composite FMR to a standardized score. If it is determined at block 42 that a target FMR has not been reached, another authentication factor may be selected in order to challenge the user again. If the target FMR has been reached, the score can be compared to the provider ranges at block 44.

A determination may be made at block 46 as to whether the score is within a provider range. If not, the next provider range can be selected at block 48, wherein the determination at block 46 may be repeated until a match is found. Illustrated block 50 signs the score, wherein a determination may be made at block 52 as to whether an IdP is in use for the service provider in question. If so, block 54 may generate an attestation message and send it to the IdP. As already noted, generation of the attestation message may involve incorporating a resource access request (e.g., uniform resource locator/URL requested by the user via a client browser) into the attestation message, and signing the attestation message. If an IdP is not in use for the service provider in question, the score may be encrypted at block 56, wherein illustrated block 58 provides for generating the attesting message and sending it to the service provider. Again, generation of the attestation message may involve incorporating a resource access request into the attestation message.

Figure 3B:
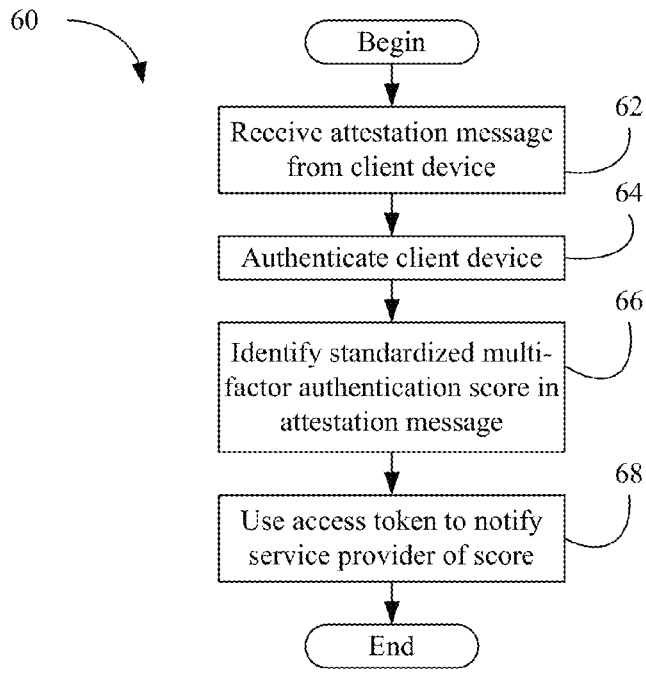
FIG. 3B is a flowchart of an example of a method of operating an identity provider according to an embodiment.

FIG. 3B shows a method 60 of operating an IdP. The method 60 may be implemented in an IdP such as, for example, the IdP 22 (FIG. 2) as a set of logic instructions and/or firmware stored in a machine- or computer-readable storage medium such as RAM, ROM, PROM, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated block 62 provides for receiving an attestation message from a client device, wherein the client device may be authenticated at block 64 in response to the attestation message. Block 66 may identify a standardized MFA score in the attestation message. Additionally, an access token can be used at block 68 to notify a service provider of the score. For example, the access token may be created based on the MFA score, signed, encrypted and sent to the service provider. In one example, a resource access request is identified in the attestation message and also incorporated into the access token.

Figure 3C:
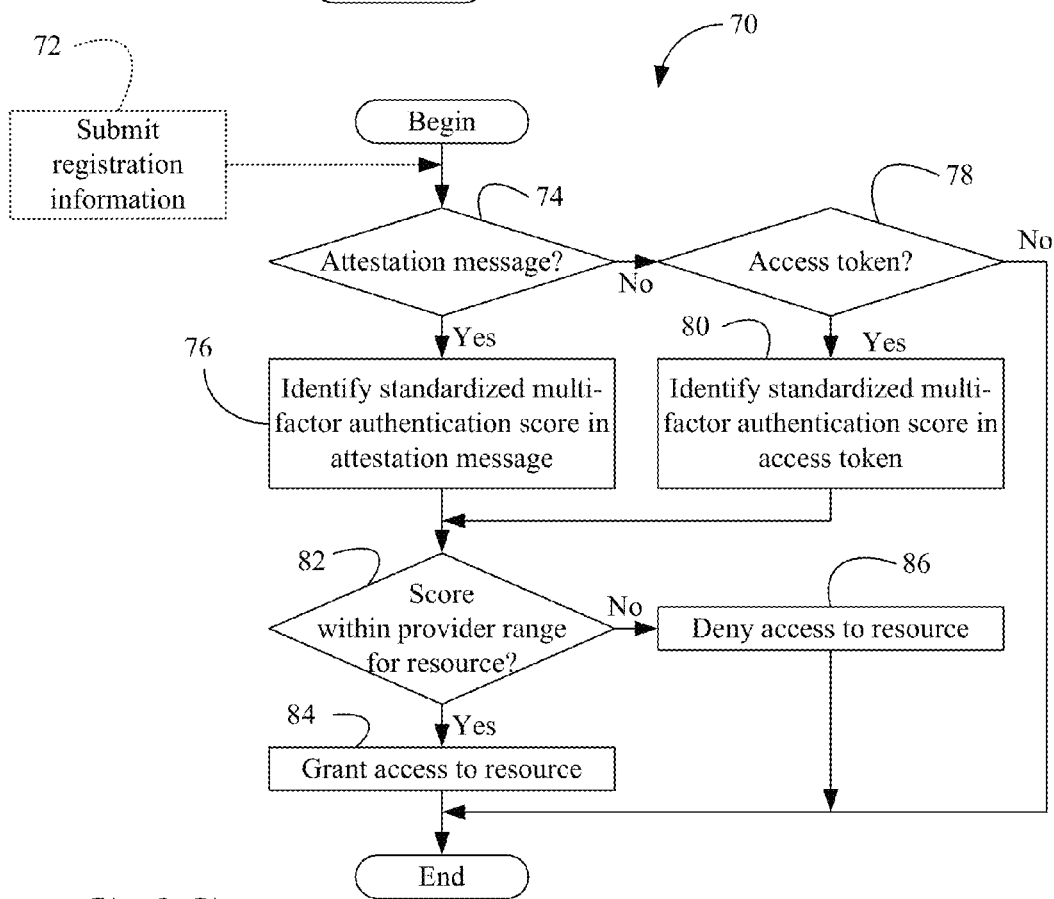
FIG. 3C is a flowchart of an example of a method of operating a service provider according to an embodiment.

FIG. 3C shows a method 70 of operating a service provider. The method 70 may be implemented in an IdP such as, for example, the service provider 16 (FIG. 2) as a set of logic instructions and/or firmware stored in a machine- or computer-readable storage medium such as RAM, ROM, PROM, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 72 provides for submitting (e.g., offline) registration information to a client device (e.g., directly or indirectly), wherein the registration information can include one or more provider ranges, target FMRs, etc., as already discussed. The registration information may also identify an IdP, if one is in use. A determination may be made at block 74 as to whether an attestation message has been received from the client device. If so, block 76 may identify a standardized MFA score in the attestation message. Otherwise, a determination is made at illustrated block 78 as to whether an access token has been received from an IdP. If so, block 80 can identify a standardized MFA score in the access token.

Additionally, block 82 may determine whether the score is within the appropriate provider range for the resource. If so, illustrated block 84 grants the client device access to the resource. If the score is outside the appropriate provider range for the resource, on the other hand, block 86 may deny access to the resource.

Figure 4:
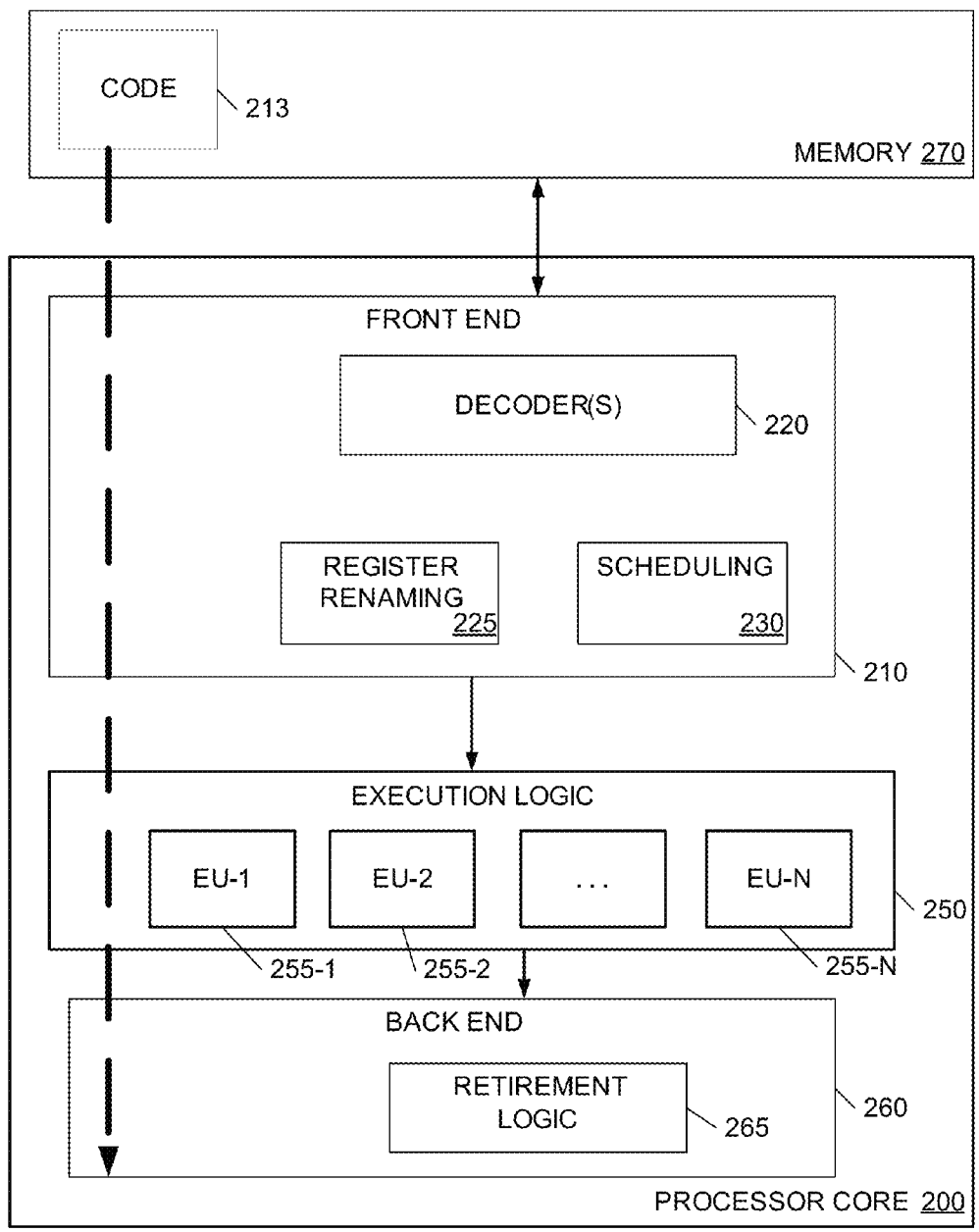
FIG. 4 is a block diagram of an example of a processor according to an embodiment.

FIG. 4 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement any of the logic architectures 24, 26, 28 (FIG. 2), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 5:
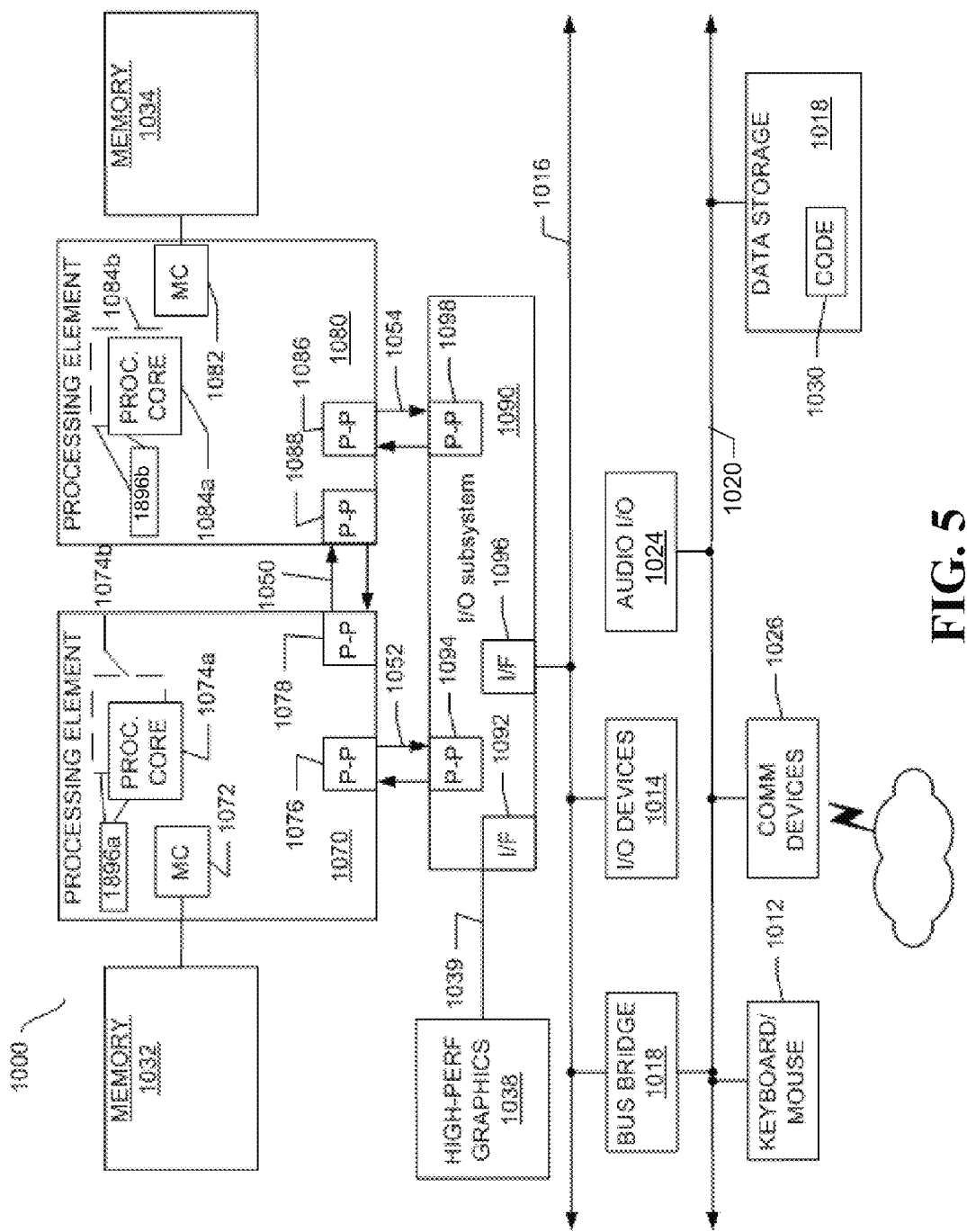
FIG. 5 is a block diagram of an example of a system according to an embodiment.

Referring now to FIG. 5, shown is a block diagram of a system 1000 in accordance with an embodiment of the present invention. Shown in FIG. 5 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 4.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 (e.g., computer readable medium, computer readable storage medium, etc.) for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 5, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. The processing elements 1070, 1090 may host a secure execution environment such as a Secure Enclave, trusted execution zone or virtual machine such that they may host the functionality of the logic architecture 24, as already discussed. Moreover, the I/O subsystem 1090 may host a secure execution environment such as a Manageability Engine, Converged Security Engine or Trusted Platform Module that may host the functionality of the logic architecture 24, as already discussed. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 5, various I/O devices 1014 may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus

1020 including, for example, a keyboard/mouse 1012, communication device(s) 1026 (which may in turn be in communication with a computer network), and a data storage unit 1018 such as a disk drive or other mass storage device which may include code 1030, in one embodiment. The code 1030 may include instructions for performing embodiments of one or more of the methods described above. Thus, the illustrated code 1030 may implement any of the aforementioned the logic architectures 24, 26, 28 (FIG. 2) and may be similar to the code 213 (FIG. 4), already discussed. Further, an audio I/O 1024 may be coupled to second bus 1020.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5.

Examples may therefore include a platform having a plurality of authentication factors and a policy module to determine a composite false match rate for the plurality of authentication factors. The platform may also include a score module to map the composite false match rate to a score, and an attestation module to generate an attestation message based on the score.

Additionally, the score of the platform example may be associated with one or more of a standardized range and a standardized level.

Additionally, the platform example may further include a network interface to send the attestation message to one or more of a service provider and an identity provider associated with the service provider, wherein the policy module is to withhold the composite false match rate from one or more of the service provider and the identity provider.

Moreover, the attestation module of the platform example may encrypt the attestation message if the attestation message is sent to the service provider.

In addition, the attestation module of the platform example may incorporate a resource access request into the attestation message.

In addition, the score module of the platform example may determine whether the score is within a provider range associated with a resource of a specific service provider.

Moreover, the platform example may further include a registration module to receive registration information from the service provider, wherein the registration information is to identify the provider range.

Additionally, the attestation module of the platform example may use an attestation key to sign the attestation message.

Additionally, the platform example may further include a challenge module to use a target false match rate to challenge a user via the plurality of authentication factors and identify a plurality of false match rates corresponding to the plurality of authentication factors, wherein the composite false match rate is to be determined based on the plurality of false match rates.

Moreover, the policy module of the platform example may multiply the plurality of false match rates together to determine the composite false match rate.

Examples may also include a computer readable storage medium having a set of instructions which, if executed by a processor, cause a client device to determine a false match rate for a plurality of authentication factors on the client device, and map the composite false match rate to a score. The instructions, if executed, may also cause the client device to generate an attestation message based on the score.

Additionally, the score of the client device medium example may be associated with one or more of a standardized range and a standardized level.

Additionally, the instructions of the client device medium example, if executed, may cause the client device to send the attestation message to one or more of a service provider and an identity provider associated with the service provider, and withhold the composite false match rate from one or more of the service provider and the identity module.

Moreover, the instructions of the client device medium example, if executed, may cause the client device to encrypt the attestation message if the attestation message is sent to the service provider.

In addition, the instructions of the client device medium example, if executed, may cause the client device to incorporate a resource access request into the attestation message.

In addition, the instructions of the client device medium example, if executed, may cause the client device to determine whether the score is within a provider range associated with a resource of a specific service provider.

Moreover, the instructions of the client device medium example, if executed, may cause the client device to receive registration information from the service provider, wherein the registration information is to identify the provider range.

Additionally, the instructions of the client device medium example, if executed, may cause the client device to use an attestation key to sign the attestation message.

Additionally, the instructions of the client device medium example, if executed, may cause the client device to use a target false match rate to challenge a user via a plurality of authentication factors, and identify a plurality of false match rates corresponding to the plurality of authentication factors, wherein the composite false match rate is to be determined based on the plurality of false match rates.

Moreover, the instructions of the client device medium example, if executed, may cause the client device to multiply the plurality of false match rates together to determine the composite false match rate.

Examples may also include a computer readable storage medium having a set of instructions which, if executed by a processor, cause an identity provider to authenticate a client device in response to an attestation message from the client device, and identify a multi-factor authentication score in the attestation message. The multi-factor authentication score may be associated with one or more of a standardized range and a standardized level.

Additionally, the instructions of the identity provider medium example, if executed, may cause the identity provider to create an access token based on the multi-authentication score, sign the access token, and send the access token to the service provider to notify the service provider of the multi-factor authentication score.

Additionally, the instructions of the identity provider medium example, if executed, may cause the identity provider to encrypt the token.

Moreover, the instructions of the identity provider medium example, if executed, may cause the identity provider to identify a resource access request in the attestation message, and incorporate the resource access request into the token.

Examples may also include a computer readable storage medium having a set of instructions which, if executed by a processor, cause a service provider to identify a multi-factor authentication score associated with one or more of a standardized range and a standardized level. Additionally, if executed, the instructions can cause the service provider to determine whether the multi-factor authentication score is within a provider range associated with a resource of the service provider, grant a client device access to the resource if the multi-factor authentication score is within the provider range, and deny the client device access to the resource if the multi-factor authentication score is outside the provider range.

Additionally, the instructions of the service provider medium example, if executed, may cause the service provider to receive an access token from an identity provider, wherein the access token includes the multi-factor authentication score.

Additionally, the instructions of the service provider medium example, if executed, may cause the service provider to receive an attestation message from the client device, wherein the attestation message includes the multi-factor authentication score.

Moreover, the instructions of the service provider medium example, if executed, may cause the service provider to submit registration information to the client device, wherein the registration information includes the provider range.

Technologies described herein may therefore define a universally reusable approach to determining when an authentication threshold strength has been achieved, as well as define an approach to combining multiple authentication factor strengths in order to form a composite authentication strength value. The mix of disparate authentication factors can vary in terms of factor type and factor strength, while still achieving the same composite strength.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGAs), logic gates, registers, semiconductor devices, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A platform comprising:
   a plurality of authentication factors, wherein each authentication factor is to be assigned a numerical false match rate that specifies a probability of a false match; and
   a hardware processor to execute:
      a policy program to determine a composite false match rate for the plurality of authentication factors, wherein a first authentication factor is to be assigned a lower numerical false match rate relative to a numerical false match rate of a second authentication factor when the first authentication factor is more secure than the second authentication factor;
      a score program to map the composite false match rate to a score, wherein the score is to be associated with one or more of a standardized range and a standardized level, wherein the standardized range is to include one or more of a minimum numerical false match rate value and a maximum false rate match value for each numerical false match rate and a minimum value of zero and a maximum value of one, wherein the standardized level is to include a threshold value, and wherein the score program is further configured to:
         select a value between the minimum numerical false match rate value and the maximum false rate match value for each numerical false match rate to represent the composite false match rate when the standardized range including the minimum numerical false match rate value and the maximum false rate match value for each numerical false match rate is used;
         select a value between the minimum value of zero and the maximum value of one to represent the composite false match rate when the minimum value of zero and the maximum value of one is used; and
         select the value of the threshold value to represent the composite false match rate when the standardized level is used; and
      an attestation program to generate an attestation message including the score to indicate of a degree of accessibility to a computing resource and to send the attestation message;
   wherein the platform is to access the computing resource based on the score.

2. The platform of claim 1, further including a network interface to send the attestation message to one or more of a service provider and an identity provider associated with the service provider, wherein the policy program is to withhold the composite false match rate from one or more of the service provider and the identity provider.

3. The platform of claim 2, wherein the attestation program is to encrypt the attestation message if the attestation message is sent to the service provider.

4. The platform of claim 1, wherein the attestation program is to incorporate a resource access request into the attestation message.

5. The platform of claim 1, wherein the score program is to determine whether the score is within a provider range associated with a resource of a specific service provider.

6. The platform of claim 5, further including a registration program to receive registration information from the service provider, wherein the registration information is to identify the provider range.

7. The platform of claim 1, wherein the attestation program is to use an attestation key to sign the attestation message.

8. The platform of claim 1, further including a challenge program to use a target false match rate to challenge a user via the plurality of authentication factors including a selection of an authentication factor from the plurality of authentication factors that is to be used to generate a numerical false rate match in response to a challenge based on the selection, and a determination of a score using the numerical false rate match generated in response to the challenge based on the selection, wherein one or more further selections are to be made for one or more further challenges when the target false match rate has not been reached, and wherein the score is to be compared to a provider range if the target false match rate has been reached.

9. The platform of claim 8, wherein the policy program is to multiply the plurality of false match rates together to determine the composite false match rate.

10. A non-transitory computer readable storage medium comprising a set of instructions which, when executed by a processor, cause a client device to:
   determine a composite false match rate for a plurality of authentication factors in an environment of the client device, wherein each authentication factor is to be assigned a numerical false match rate that specifies a probability of a false match, and wherein a first authentication factor is to be assigned a lower numerical false match rate relative to a numerical false match rate of a second authentication factor when the first authentication factor is more secure than the second authentication factor;
   map the composite false match rate to a score, wherein the score is to be associated with one or more of a standardized range and a standardized level, wherein the standardized range is to include one or more of a minimum numerical false match rate value and a maximum false rate match value for each numerical false match rate and a minimum value of zero and a maximum value of one, wherein the standardized level is to include a threshold value, and wherein the instructions, if executed, cause the client device further to:
      select a value between the minimum numerical false match rate value and the maximum false rate match value for each numerical false match rate to represent the composite false match rate when the standardized range including the minimum numerical false match rate value and the maximum false rate match value for each numerical false match rate is used;

select a value between the minimum value of zero and the maximum value of one to represent the composite false match rate when the minimum value of zero and the maximum value of one is used; and select the value of the threshold value to represent the composite false match rate when the standardized level is used;

generate an attestation message including the score to indicate of a degree of accessibility to a computing resource; and send the attestation message, wherein the client device is to access the computing resource based on the score.

11. The non-transitory computer readable storage medium of claim 10, wherein the instructions, when executed, cause the client device to:

send the attestation message to one or more of a service provider and an identity provider associated with the service provider; and withhold the composite false match rate from one or more of the service provider and the identity provider.

12. The non-transitory computer readable storage medium of claim 11, wherein the instructions, when executed, cause the client device to encrypt the attestation message if the attestation message is sent to the service provider.

13. The non-transitory computer readable storage medium of claim 10, wherein the instructions, when executed, cause the client device to incorporate a resource access request into the attestation message.

14. The non-transitory computer readable storage medium of claim 10, wherein the instructions, when executed, cause the client device to determine whether the score is within a provider range associated with a resource of a specific service provider.

15. The non-transitory computer readable storage medium of claim 14, wherein the instructions, when executed, cause the client device to receive registration information from the service provider, wherein the registration information is to identify the provider range.

16. The non-transitory computer readable storage medium of claim 10, wherein the instructions, when executed, cause the client device to use an attestation key to sign the attestation message.

17. The non-transitory computer readable storage medium of claim 10, wherein the instructions, when executed, cause the client device to use a target false match rate to challenge a user via a plurality of authentication factors including a selection of an authentication factor from the plurality of authentication factors that is to be used to generate a numerical false rate match in response to a challenge based on the selection, and a determination of a score using the numerical false rate match generated in response to the challenge based on the selection, wherein one or more further selections are to be made for one or more further challenges when the target false match rate has not been reached, and wherein the score is to be compared to a provider range if the target false match rate has been reached.

18. The non-transitory computer readable storage medium of claim 17, wherein the instructions, when executed, cause the client device to multiply the plurality of false match rates together to determine the composite false match rate.

19. A non-transitory computer readable storage medium comprising a set of instructions which, when executed by a processor, cause an identity provider to:

authenticate a client device in response to an attestation message from the client device;

identify a multi-factor authentication score in the attestation message indicative of a degree of accessibility to a computing resource, wherein the multifactor authentication score is to mask a composite false match rate for a plurality of authentication factors, wherein each authentication factor is to be assigned a numerical false match rate that specifies a probability of a false match, wherein a first authentication factor is to be assigned a lower numerical false match rate relative to a numerical false match rate of a second authentication factor when the first authentication factor is more secure than the second authentication factor, wherein the multi-factor score is to be associated with one or more of a standardized range and a standardized level, wherein the standardized range is to include one or more of a minimum numerical false match rate value and a maximum false rate match value for each numerical false match rate and a minimum value of zero and a maximum value of one, wherein the standardized level is to include a threshold value, and wherein multi-factor authentication score is to be:

selected as a value between the minimum numerical false match rate value and the maximum false rate match value for each numerical false match rate to represent the composite false match rate when the standardized range including the minimum numerical false match rate value and the maximum false rate match value for each numerical false match rate is used:

selected as a value between the minimum value of zero and the maximum value of one to represent the composite false match rate when the minimum value of zero and the maximum value of one is used; and selected as the value of the threshold value to represent the composite false match rate when the standardized level is used; and notify a service provider of the multi-factor authentication score, wherein the client device is to access the computing resource from the service provider based on the multi-factor authentication score.

20. The non-transitory computer readable storage medium of claim 19, wherein the instructions, when executed, cause the identity provider to:

create an access token based on the multi-authentication score;

sign the access token; and send the access token to the service provider to notify the service provider of the multifactor authentication score.

21. The non-transitory computer readable storage medium of claim 20, wherein the instructions, when executed, cause the identity provider to encrypt the token.

22. The non-transitory computer readable storage medium of claim 20, wherein the instructions, when executed, cause the identity provider to:

identify a resource access request in the attestation message; and incorporate the resource access request into the token.

23. A non-transitory computer readable storage medium comprising a set of instructions which, when executed by a processor, cause a service provider to:

identify a multi-factor authentication score indicative of a degree of accessibility to a computing resource, wherein the multi-factor authentication score is to mask a composite false match rate for a plurality of authentication factors, wherein each authentication factor is to be assigned a numerical false match rate that specifies a probability of a false match, wherein a first authentication factor is to be assigned a lower numerical false match rate relative to a numerical false match rate of a second authentication factor when the first authentication factor is more secure than the second authentication factor, wherein the multi-factor score is to be associated with one or more of a standardized range and a standardized level, wherein the standardized range is to include one or more of a minimum numerical false match rate value and a maximum false rate match value for each numerical false match rate and a minimum value of zero and a maximum value of one, wherein the standardized level is to include a threshold value, and wherein multi-factor score is to be:

selected as a value between the minimum numerical false match rate value and the maximum false rate match value for each numerical false match rate to represent the composite false match rate when the standardized range including the minimum numerical false match rate value and the maximum false rate match value for each numerical false match rate is used;

selected as a value between the minimum value of zero and the maximum value of one to represent the composite false match rate when the minimum value of zero and the maximum value of one is used; and selected as the value of the threshold value to represent the composite false match rate when the standardized level is used;

determine whether the multi-factor authentication score is within a provider range associated with the computing resource of the service provider;

grant a client device access to the computing resource when the multi-factor authentication score is within the provider range; and deny the client device access to the computing resource when the multi-factor authentication score is outside the provider range.

24. The non-transitory computer readable storage medium of claim 23, wherein the instructions, when executed, cause the service provider to receive an access token from an identity provider, wherein the access token includes the multi-factor authentication score.

25. The non-transitory computer readable storage medium of claim 23, wherein the instructions, when executed, cause the service provider to receive an attestation message from the client device, wherein the attestation message includes the multi-factor authentication score.

26. The non-transitory computer readable storage medium of claim 23, wherein the instructions, if executed, cause the service provider to submit registration information to the client device, wherein the registration information includes the provider range.

\* \* \* \* \*